United States Patent
Robey et al.

(10) Patent No.: US 6,310,986 B2
(45) Date of Patent: *Oct. 30, 2001

(54) IMAGE ROTATION ASSIST CIRCUITRY AND METHOD

(75) Inventors: Joshua Robey, Hollis, NH (US); Mark Busa, Needham, MA (US)

(73) Assignee: Oak Technology, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/204,980

(22) Filed: Dec. 3, 1998

(51) Int. Cl.$^7$ .................................................. G06K 9/32
(52) U.S. Cl. ................................. 382/296; 345/126
(58) Field of Search ........................... 382/296, 297, 382/295, 298, 299; 345/126, 436; 348/583

(56) References Cited

U.S. PATENT DOCUMENTS

| | | | |
|---|---|---|---|
| 4,168,488 | | 9/1979 | Evans ................................. 340/146.3 |
| 4,593,407 | * | 6/1986 | Konishi et al. ....................... 382/297 |
| 4,636,783 | | 1/1987 | Omachi ................................. 340/727 |
| 4,689,824 | | 8/1987 | Mitchell et al. ........................ 382/46 |
| 4,703,515 | | 10/1987 | Baroody, Jr. ............................ 382/46 |
| 4,806,920 | | 2/1989 | Sawada ................................. 340/727 |
| 4,850,028 | * | 7/1989 | Kawamura et al. ..................... 382/46 |
| 4,975,977 | * | 12/1990 | Kurosu et al. .......................... 382/46 |
| 5,068,904 | * | 11/1991 | Yamazaki ............................... 382/46 |
| 5,426,733 | * | 6/1995 | Masui .................................. 395/166 |
| 5,563,625 | | 10/1996 | Scott .................................... 345/125 |
| 5,581,635 | | 12/1996 | Zhu et al. ............................. 382/245 |
| 5,657,431 | | 8/1997 | Plakosh et al. ........................ 395/115 |
| 5,854,641 | * | 12/1998 | Howard et al. ........................ 345/517 |
| 5,966,116 | * | 10/1999 | Wakeland ............................. 345/126 |
| 5,991,450 | * | 11/1999 | Ohsawa et al. ........................ 382/245 |

* cited by examiner

*Primary Examiner*—Joseph Mancuso
*Assistant Examiner*—Yosef Kassa
(74) *Attorney, Agent, or Firm*—Testa, Hurwitz & Thibeault, LLP

(57) ABSTRACT

A method and apparatus for assisting in the rotation of digital images is described. The digital image is divided by a separate process into image blocks which are rotated through a predetermined angle. Data moving hardware then processes the image blocks to determine the proper placement of each block in a frame buffer to create a properly rotated image. A set of predetermined values based on characteristics of the input image and the predetermined output image format is provided to the data moving hardware from a value processor. The data moving hardware performs only additions and subtractions. The only multiplication necessary for the method is performed by the processor prior to placement of the rotated image blocks in an output frame buffer. Thus the rate of processing the rotated image blocks is significantly improved.

11 Claims, 9 Drawing Sheets

90° CLOCKWISE 8 BIT BLOCK ROTATION
32 PIXEL x 16 LINE IMAGE

INPUT DATA STREAM

| 16a 16b 16c | 1ST BYTE | | | | | | | 12a 2ND BYTE | | | | | | | | 12b 3RD BYTE | | | | | | | | | | | | | | | | | 10 |
|---|---|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | |
| 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | |
| 64 | 65 | 66 | 67 | 68 | 69 | 70 | 71 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | |
| 96 | 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 | |
| 128 | 129 | 130 | 131 | 132 | 133 | 134 | 135 | 136 | 137 | 138 | 139 | 140 | 141 | 142 | 143 | 144 | 145 | 146 | 147 | 148 | 149 | 150 | 151 | 152 | 153 | 154 | 155 | 156 | 157 | 158 | 159 | |
| 160 | 161 | 162 | 163 | 164 | 165 | 166 | 167 | 168 | 169 | 170 | 171 | 172 | 173 | 174 | 175 | 176 | 177 | 178 | 179 | 180 | 181 | 182 | 183 | 184 | 185 | 186 | 187 | 188 | 189 | 190 | 191 | |
| 192 | 193 | 194 | 195 | 196 | 197 | 198 | 199 | 200 | 201 | 202 | 203 | 204 | 205 | 206 | 207 | 208 | 209 | 210 | 211 | 212 | 213 | 214 | 215 | 216 | 217 | 218 | 219 | 220 | 221 | 222 | 223 | |
| 224 | 225 | 226 | 227 | 228 | 229 | 230 | 231 | 232 | 233 | 234 | 235 | 236 | 237 | 238 | 239 | 240 | 241 | 242 | 243 | 244 | 245 | 246 | 247 | 248 | 249 | 250 | 251 | 252 | 253 | 254 | 255 | |
| 256 | 257 | 258 | 259 | 260 | 261 | 262 | 263 | 264 | 265 | 266 | 267 | 268 | 269 | 270 | 271 | 272 | 273 | 274 | 275 | 276 | 277 | 278 | 279 | 280 | 281 | 282 | 283 | 284 | 285 | 286 | 287 | |
| 288 | 289 | 290 | 291 | 292 | 293 | 294 | 295 | 296 | 297 | 298 | 299 | 300 | 301 | 302 | 303 | 304 | 305 | 306 | 307 | 308 | 309 | 310 | 311 | 312 | 313 | 314 | 315 | 316 | 317 | 318 | 319 | |
| 320 | 321 | 322 | 323 | 324 | 325 | 326 | 327 | 328 | 329 | 330 | 331 | 332 | 333 | 334 | 335 | 336 | 337 | 338 | 339 | 340 | 341 | 342 | 343 | 344 | 345 | 346 | 347 | 348 | 349 | 350 | 351 | |
| 352 | 353 | 354 | 355 | 356 | 357 | 358 | 359 | 360 | 361 | 362 | 363 | 364 | 365 | 366 | 367 | 368 | 369 | 370 | 371 | 372 | 373 | 374 | 375 | 376 | 377 | 378 | 379 | 380 | 381 | 382 | 383 | |
| 384 | 385 | 386 | 387 | 388 | 389 | 390 | 391 | 392 | 393 | 394 | 395 | 396 | 397 | 398 | 399 | 400 | 401 | 402 | 403 | 404 | 405 | 406 | 407 | 408 | 409 | 410 | 411 | 412 | 413 | 414 | 415 | |
| 416 | 417 | 418 | 419 | 420 | 421 | 422 | 423 | 424 | 425 | 426 | 427 | 428 | 429 | 430 | 431 | 432 | 433 | 434 | 435 | 436 | 437 | 438 | 439 | 440 | 441 | 442 | 443 | 444 | 445 | 446 | 447 | |
| 448 | 449 | 450 | 451 | 452 | 453 | 454 | 455 | 456 | 457 | 458 | 459 | 460 | 461 | 462 | 463 | 464 | 465 | 466 | 467 | 468 | 469 | 470 | 471 | 472 | 473 | 474 | 475 | 476 | 477 | 478 | 479 | |
| 480 | 481 | 482 | 483 | 484 | 485 | 486 | 487 | 488 | 489 | 490 | 491 | 492 | 493 | 494 | 495 | 496 | 497 | 498 | 499 | 500 | 501 | 502 | 503 | 504 | 505 | 506 | 507 | 508 | 509 | 510 | 511 | |

90° CLOCKWISE 8 BIT BLOCK ROTATION
32 PIXEL x 16 LINE IMAGE

DATA ROTATED IN CHIP'S LINE BUFFERS (IN INPUT PIXEL NUMBERS)

90° CLOCKWISE 8 BIT BLOCK ROTATION
32 PIXEL x 16 LINE IMAGE
DATA PLACED IN OUTPUT BUFFER (IN INPUT PIXEL NUMBERS)

```
480 448 416 384 352 320 288 256 | 224 192 160 128  96 64  0 |  ←1ST
481 449 417 385 353 321 289 257 | 225 193 161 129  97 65 33  1 | OUTPUT
482 450 418 386 354 322 290 258 | 226 194 162 130  98 66 34  2 | BYTE
483 451 419 387 355 323 291 259 | 227 195 163 131  99 67 35  3 |
484 452 420 388 356 324 292 260 | 228 196 164 132 100 68 36  4 | 12a
485 453 421 389 357 325 293 261 | 229 197 165 133 101 69 37  5 |
486 454 422 390 358 326 294 262 | 230 198 166 134 102 70 38  6 |
487 455 423 391 359 327 295 263 | 231 199 167 135 103 71 39  7 |
488 456 424 392 360 328 296 264 | 232 200 168 136 104 72 40  8 | ←2ND
489 457 425 393 361 329 297 265 | 233 201 169 137 105 73 41  9 | OUTPUT
490 458 426 394 362 330 298 266 | 234 202 170 138 106 74 42 10 | BYTE
491 459 427 395 363 331 299 267 | 235 203 171 139 107 75 43 11 |
492 460 428 396 364 332 300 268 | 236 204 172 140 108 76 44 12 | 12b
493 461 429 397 365 333 301 269 | 237 205 173 141 109 77 45 13 |
494 462 430 398 366 334 302 270 | 238 206 174 142 110 78 46 14 |
495 463 431 399 367 335 303 271 | 239 207 175 143 111 79 47 15 |
496 464 432 400 368 336 304 272 | 240 208 176 144 112 80 48 16 | ←3RD
497 465 433 401 369 337 305 273   241 209 177 145 113 81 49 17   OUTPUT
498 466 434 402 370 338 306 274   242 210 178 146 114 82 50 18   BYTE
499 467 435 403 371 339 307 275   243 211 179 147 115 83 51 19
500 468 436 404 372 340 308 276   244 212 180 148 116 84 52 20   18
501 469 437 405 373 341 309 277   245 213 181 149 117 85 53 21
502 470 438 406 374 342 310 278   246 214 182 150 118 86 54 22
503 471 439 407 375 343 311 279   247 215 183 151 119 87 55 23
504 472 440 408 376 344 312 280   248 216 184 152 120 88 56 24
505 473 441 409 377 345 313 281   249 217 185 153 121 89 57 25
506 474 442 410 378 346 314 282   250 218 186 154 122 90 58 26
507 475 443 411 379 347 315 283   251 219 187 155 123 91 59 27
508 476 444 412 380 348 316 284   252 220 188 156 124 92 60 28
509 477 445 413 381 349 317 285   253 221 189 157 125 93 61 29
510 478 446 414 382 350 318 286   254 222 190 158 126 94 62 30
511 479 447 415 383 351 319 287   255 223 191 159 127 95 63 31
```

| 0:1 | 1:2 | 2:3 | 3:1 | 4:2 | 5:3 | 6:1 | 7:2 | 8:3 |
|---|---|---|---|---|---|---|---|---|
| 9:4 | 10:5 | 11:6 | 12:4 | 13:5 | 14:6 | 15:4 | 16:5 | 17:6 |
| 18:7 | 19:8 | 20:9 | 21:7 | 22:8 | 23:9 | 24:7 | 25:8 | 26:9 |
| 27:10 | 28:11 | 29:12 | 30:10 | 31:11 | 32:12 | 33:10 | 34:11 | 35:12 |
| 36:13 | 37:14 | 38:15 | 39:13 | 40:14 | 41:15 | 42:13 | 43:14 | 44:15 |
| 45:16 | 46:17 | 47:18 | 48:16 | 49:17 | 50:18 | 51:16 | 52:17 | 53:18 |
| 54:19 | 55:20 | 56:21 | 57:19 | 58:20 | 59:21 | 60:19 | 61:20 | 62:21 |
| 63:22 | 64:23 | 65:24 | 66:22 | 67:23 | 68:24 | 69:22 | 70:23 | 71:24 |
| 72:25 | 73:26 | 74:27 | 75:25 | 76:26 | 77:27 | 78:25 | 79:26 | 80:27 |
| 81:28 | 82:29 | 83:30 | 84:28 | 85:29 | 86:30 | 87:28 | 88:29 | 89:30 |
| 90:31 | 91:32 | 92:33 | 93:31 | 94:32 | 95:33 | 96:31 | 97:32 | 98:33 |
| 99:34 | 100:35 | 101:36 | 102:34 | 103:35 | 104:36 | 105:34 | 106:35 | 107:36 |
| 108:37 | 109:38 | 110:39 | 111:37 | 112:38 | 113:39 | 114:37 | 115:38 | 116:39 |
| 117:40 | 118:41 | 119:42 | 120:40 | 121:41 | 122:42 | 123:40 | 124:41 | 125:42 |
| 126:43 | 127:44 | 128:45 | 129:43 | 130:44 | 131:45 | 132:43 | 133:44 | 134:45 |
| 135:46 | 136:47 | 137:48 | 138:46 | 139:46 | 140:48 | 141:46 | 142:47 | 143:48 |
| 144:1 | 145:2 | 146:3 | 147:1 | 148:2 | 149:3 | 150:1 | 151:2 | 153:3 |
| 153:4 | 154:5 | 155:6 | 156:4 | 157:5 | 158:6 | 159:4 | 160:5 | 161:9 |
| 162:7 | 163:8 | 164:9 | 165:7 | 166:8 | 167:9 | 168:7 | 169:8 | 170:9 |
| 171:10 | 172:11 | 173:12 | 174:10 | 175:11 | 176:12 | 177:10 | 178:11 | 179:12 |
| 180:13 | 181:14 | 182:15 | 183:13 | 184:14 | 185:15 | 186:13 | 187:14 | 188:15 |
| 189:16 | 190:17 | 191:18 | 192:16 | 193:17 | 194:18 | 195:16 | 196:17 | 197:18 |
| 198:19 | 199:20 | 200:21 | 201:19 | 202:20 | 203:21 | 204:19 | 205:20 | 206:21 |
| 207:22 | 208:23 | 209:24 | 210:22 | 211:22 | 212:24 | 213:22 | 214:23 | 215:24 |
| 216:25 | 217:26 | 218:27 | 219:25 | 220:26 | 221:27 | 222:25 | 223:26 | 224:27 |
| 225:28 | 226:29 | 227:30 | 228:28 | 229:29 | 230:30 | 231:28 | 232:29 | 233:30 |
| 234:31 | 235:32 | 236:33 | 237:31 | 238:32 | 239:33 | 240:31 | 241:32 | 242:33 |
| 243:34 | 244:35 | 245:36 | 246:34 | 247:35 | 248:36 | 249:34 | 250:35 | 251:36 |
| 252:37 | 253:38 | 254:39 | 255:37 | 256:38 | 257:39 | 258:37 | 259:38 | 260:39 |
| 261:40 | 262:41 | 263:42 | 264:40 | 265:41 | 266:42 | 267:40 | 268:41 | 269:42 |
| 270:43 | 271:44 | 272:45 | 273:43 | 274:44 | 275:45 | 276:43 | 277:44 | 278:45 |
| 279:46 | 280:47 | 281:48 | 282:46 | 283:47 | 284:48 | 285:46 | 286:47 | 287:48 |
| 288:1 | 289:2 | 290:3 | 291:1 | 292:2 | 293:3 | 294:1 | 295:2 | 296:3 |
| 297:4 | 298:5 | 299:6 | 300:4 | 301:5 | 302:6 | 303:4 | 304:5 | 305:6 |
| 306:7 | 307:8 | 308:9 | 309:70 | 310:8 | 311:9 | 312:7 | 313:8 | 314:9 |
| 315:10 | 316:11 | 317:12 | 318:10 | 319:11 | 320:12 | 321:10 | 322:11 | 323:12 |
| 324:13 | 325:14 | 326:15 | 327:13 | 328:14 | 329:15 | 330:13 | 331:14 | 332:15 |
| 333:16 | 334:17 | 335:18 | 336:16 | 337:17 | 338:18 | 339:16 | 340:17 | 341:18 |
| 342:19 | 343:20 | 344:21 | 345:19 | 346:20 | 347:21 | 348:19 | 349:20 | 350:21 |
| 351:22 | 352:23 | 353:24 | 354:22 | 355:23 | 356:24 | 357:22 | 358:23 | 359:24 |
| 360:25 | 361:26 | 362:27 | 363:25 | 364:26 | 365:27 | 366:25 | 367:26 | 368:27 |
| 369:28 | 370:29 | 371:30 | 372:28 | 373:29 | 374:30 | 375:28 | 376:29 | 377:30 |
| 378:31 | 379:32 | 380:33 | 381:31 | 382:32 | 383:33 | 384:31 | 385:32 | 386:33 |
| 387:34 | 388:35 | 389:36 | 390:34 | 391:35 | 392:36 | 393:34 | 394:35 | 395:36 |
| 396:37 | 397:38 | 398:39 | 399:37 | 400:38 | 401:39 | 402:37 | 403:38 | 404:39 |
| 405:40 | 406:41 | 407:42 | 408:40 | 409:41 | 410:42 | 411:40 | 412:41 | 413:42 |
| 414:43 | 415:44 | 416:45 | 417:43 | 418:44 | 419:45 | 420:43 | 421:44 | 422:45 |
| 423:46 | 424:47 | 425:48 | 426:46 | 427:47 | 428:48 | 429:46 | 430:47 | 431:48 |

IMAGE ROTATION ASSIST CIRCUITRY AND METHOD

FIELD OF THE INVENTION

The invention relates generally to a method and apparatus for assisting in the rotation of digital image data. In particular, the invention relates to a method of assisting in the placement of rotated image blocks in an image buffer.

BACKGROUND OF THE INVENTION

Document imaging systems (e.g., copiers and fax machines) often represent an image as digital data for use in the reproduction of the original image. Some document imaging systems include an image processing chip which provides an image block rotation assist function for rotation angles which are integer multiples of 90°. The output of this rotation assist function is a version of the input image which has been divided into individually rotated image blocks. Logic is implemented (in software or hardware) independent of the chip to place the rotated image blocks in a frame buffer to create a properly rotated image therein. The logic can be computationally intensive. The problem is further complicated if the frame buffer is larger than the output image (e.g., when placing multiple rotated images onto a single page).

Since the output bandwidth of these image processing chips is usually high, output data is typically handled by a hardware data moving device (e.g., a DMA controller). When the output of the image processing chip includes rotated image blocks, the required block placement creates an additional burden on the data moving device. A processor can used to read each output unit (e.g., byte, word) and properly place it in the frame buffer, however, use of the processor can substantially limit the rate at which image blocks are placed in the frame buffer. Hardware can be designed to determine and place the image blocks in memory, but such hardware is usually required to perform multiplication operations to generate the proper frame buffer address. Multiplication operations require a substantial number of digital logic components in the hardware and limit the rate at which image blocks are transferred into memory.

SUMMARY OF THE INVENTION

The present invention relates to a method and apparatus for proper placement of rotated image blocks in an image memory module which can be implemented in simple data moving hardware. A processor provides a set of information to a hardware data mover before an image is processed, and the data mover performs a simple set of operations quickly and without need for multiplication operations or further processor intervention. The processor performs a set of predetermined calculations to generate the set of information for the data mover. A set of simple operations which are independent of the rotation increment (i.e., 0°, 90°, 180° or 270°) are then performed by the data mover to generate single or multiple images within the image memory module. These operations place the rotated image blocks in the proper location in the memory module. Thus, a single process of reduced complexity can be implemented in hardware which requires no processor intervention.

In one aspect, the invention features a method for assisting in the rotation of a digital image. A set of precalculated values generated by a value processor is received. Rotated image blocks comprised of sub-blocks from an image processor are also received. A destination address for each sub-block is determined according to the precalculated values and each sub-block is stored at its destination address in an image memory module. The generation of the precalculated values can be based on a predetermined rotation angle, an image block size, horizontal and vertical dimensions of the digital image, and an image memory module dimension. In one embodiment, the precalculated values are generated prior to determining each destination address. In another embodiment, each destination address is determined using only addition and subtraction operations. In yet another embodiment, a digital image is received and the rotated image blocks are generated from the digital image.

In another aspect, the invention features an apparatus for assisting in the rotation of a digital image. The apparatus includes a rotation assist module electrically coupled to a memory module. The rotation assist module includes a value input for receiving precalculated values and a rotated block input for receiving a plurality of rotated image blocks comprising a plurality of sub-blocks. The memory module stores each sub-block at a corresponding destination address generated by the rotation assist module. In one embodiment, a processor for generation of the precalculated values is electrically coupled to the rotation assist module. In another embodiment, the apparatus includes an input module for receiving the digital image and an image processor for generating and rotating the plurality of image blocks.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

FIGS. 6A through 6C illustrate a 90° clockwise rotation of digital image data according the method of the invention.

FIGS. 7A through 7B illustrate the placement of 0° rotated image data in a frame buffer for an example where nine digital images are stored in a memory module.

DETAILED DESCRIPTION OF THE INVENTION

Figure 1:
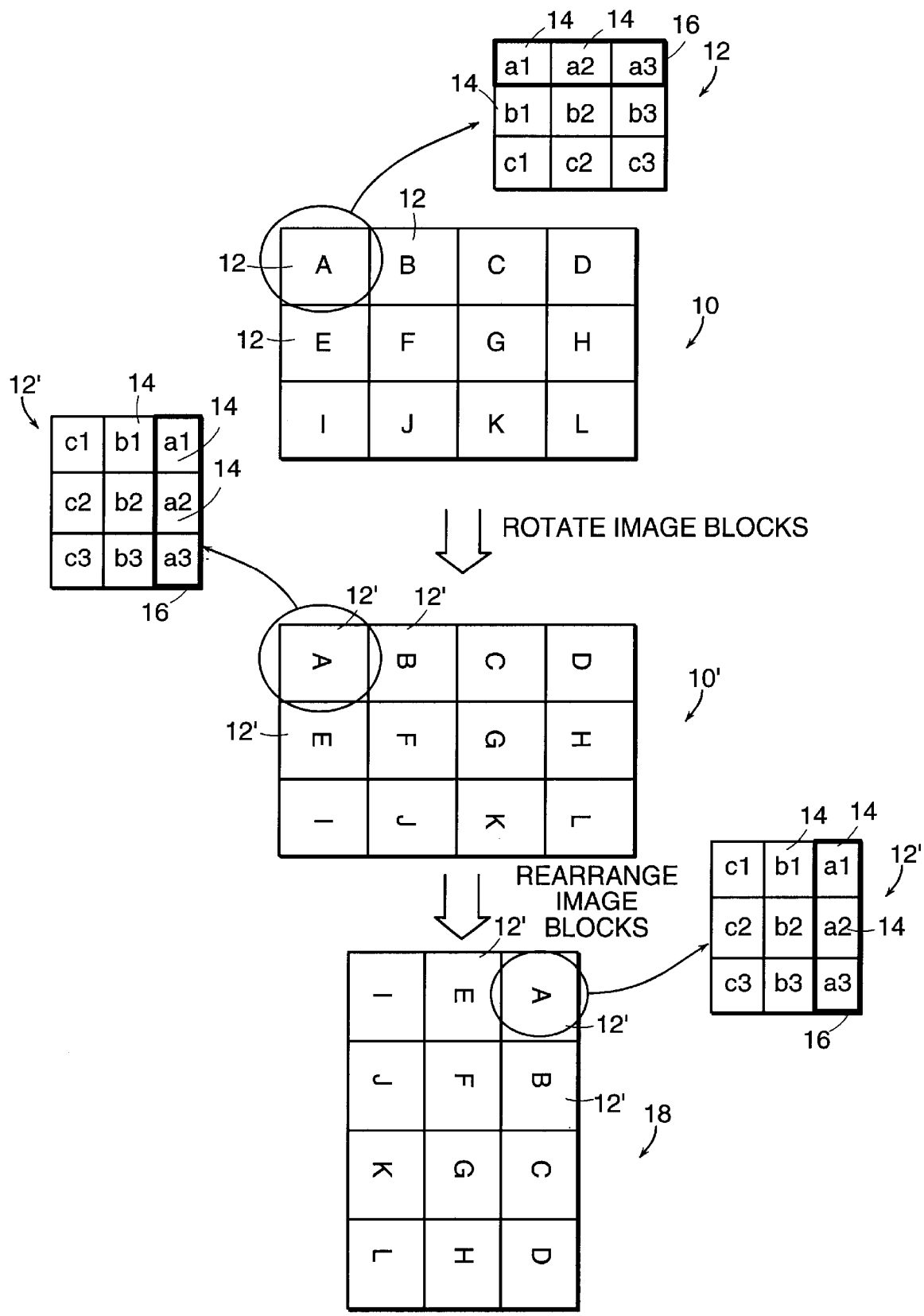
FIG. 1 is a block diagram illustrating the process of rotating an image by rotating image blocks and placing the image blocks in an image buffer.

FIG. 1 illustrates a process for transforming a digital image 10 into a rotated digital image 18 (rotated clockwise by 90°). The digital image 10 is divided into a series of image blocks 12 identified as A, B, . . . , L. In this example, each image block 12 includes a 3×3 array of pixels 14 identified as a1, a2, . . . , c3. Pixels a1, a2 and a3 define a three pixel sub-block 16. Similarly, pixels b1, b2 and b3 and pixels c1, c2 and c3 define a second and third sub-block 16, respectively. In this example, a monochrome image is assumed, thus each pixel 14 has a single intensity represented by a single bit. In color images, each pixel 14 is typically represented by multiple color values and each color value is represented by a series of binary bits. An image processor individually rotates each image block 12 to generate a blockwise rotated image 10' in a line buffer. The data in the line buffer is then provided as a line by line output to a separate processing unit which rearranges the rotated image blocks 12' into a fully rotated image 18 in an image memory.

Figure 2:
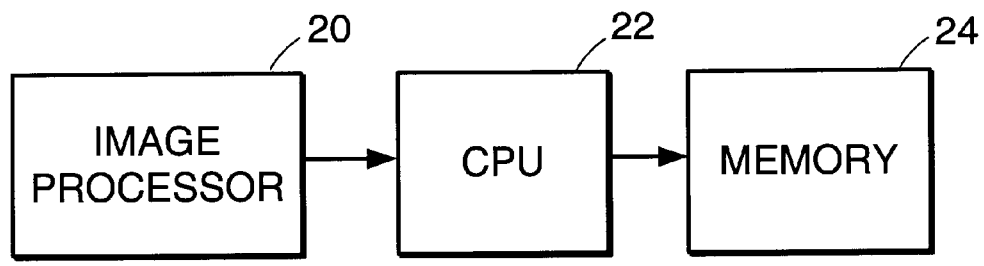
FIG. 2 is a block diagram of a conventional apparatus for rotating an image using rotated image blocks.

Referring to FIG. 2, a conventional apparatus for rotating a digital image 10 includes an image processor 20, a block processor module 22 (e.g., a CPU) and a memory module 24 (e.g., a frame buffer). The image processor 20 generates rotated image blocks 12' comprising multiple sub-blocks 16. Sub-blocks 16 can be defined so that the number of bits in each sub-block 16 is equivalent to a byte. These sub-blocks 16 are processed by the CPU 22 and placed in the memory module 24 at the proper destination address.

Figure 3:
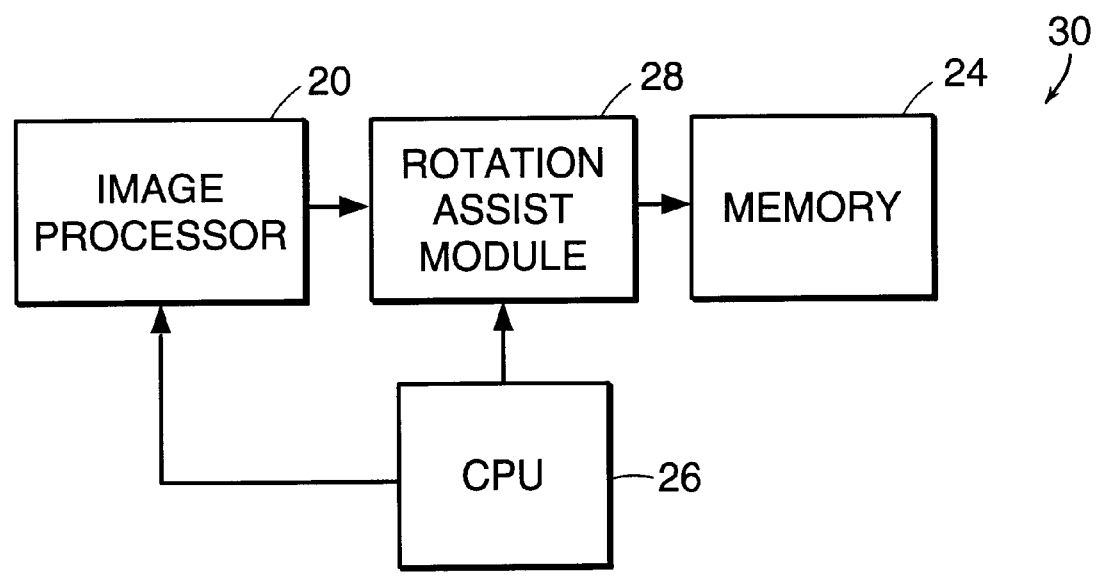
FIG. 3 is a block diagram of an apparatus for rotating an image using rotated image blocks according to the invention.

Referring to FIG. 3, a digital image rotation device 30 for rotating a digital image 10 includes an image processor 20, a memory module 24, a value processor 26 (e.g., a CPU) and a rotation assist module 28. The rotation assist module 28 can be a field programmable gate array (FPGA), an ASIC or other data moving hardware. A set of predefined calculations are performed by the value processor 26 to generate a set of precalculated values. These precalculated values are provided to the rotation assist module 28 before the rotated image blocks 12' from the image processor 20 are received. The calculations permit the rotation assist module 28 to perform the same operations regardless of the rotation (0°, 90°, 180° or 270°) and also permit more than one fully rotated image 18 to be placed in the image memory 24.

The rotation assist module 28 performs a set of operation quickly because multiplication operations are not required. In one embodiment, no further calculations are required from the value processor 26 after generation of the precalculated values. As a result, simple data moving hardware can be used in the rotation assist module 28.

Figure 4:
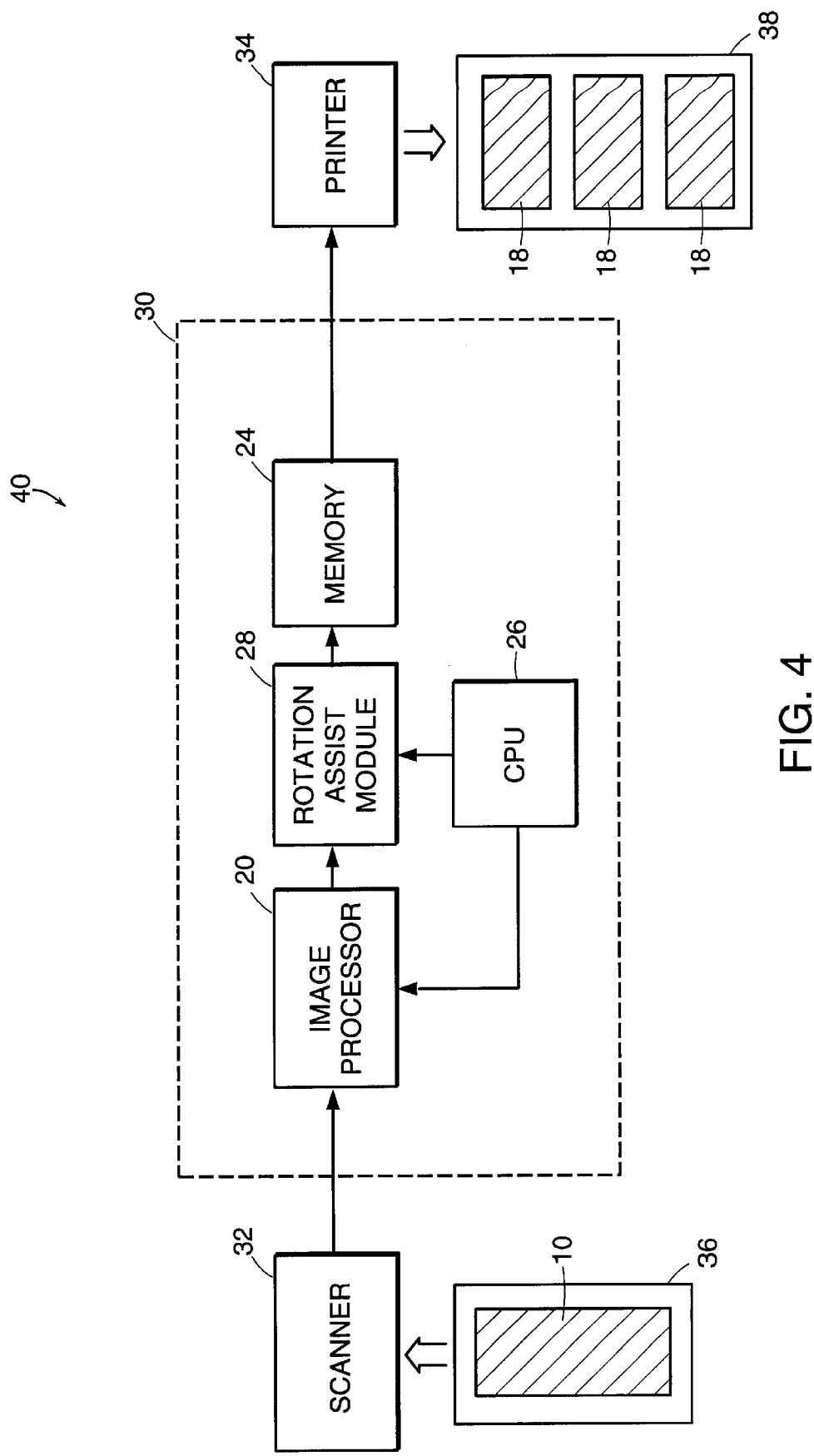
FIG. 4 is a block diagram of a process for printing a rotated version of a scanned image according to the invention.

FIG. 4 shows the digital image rotation device 30 of FIG. 3 configured for printing three fully rotated images 18 (90° clockwise rotation in a 3-up format) of three scanned images in a digital copier 40. An optical scanner 32 scans an image document 36 which includes a digital image 10 to be reproduced in reduced size in triplicate on an output document 38. The image processor 20 generates pixel values corresponding to the three reduced images 18, generates rotated image blocks 12' from these pixel values and provides them to the rotation assist module 28 (e.g., FPGA) for rearrangement. Precalculated values from the CPU 26 are used by the rotation assist module 28 to calculate the destination addresses for all the sub-blocks 16 in each of the fully rotated images 18. The sub-blocks 16 are placed in memory 24 by the rotation assist module 28 and then printed from memory 24 by the printer 34.

Table 1 below indicates the values that the value processor 26 supplies to the rotation assist module 28. Some of the values are defined by the digital image 10 and the memory module 24, and others are calculated from these values and provided to the rotation assist module 28 so that no multiplication needs to be performed by the rotation assist module 28. Two types of rotations are considered. The first case includes rotating a single digital image 10 and placing it in the memory module 24. The second case (i.e., the N-up case) includes generating multiple small images on a single document. The same operations are implemented in the rotation assist module 28 for both cases. An additional offset must be included for the calculation of Start Address (described below) for the second case.

TABLE 1

|  | 0° | 90° | 180° | 270° |
| --- | --- | --- | --- | --- |
| Start Address | 0 | OHD − 1 | (IVD*BS*OHD) − 1 | (IHD − 1)*BS*OHD |
| Increment 1 | 1 | BS*OHD | −1 | −BS*OHD |
| Increment 2 | OHD | OHD | −OHD | −OHD |
| Increment 3 | BS*OHD | −1 | −BS*OHD | 1 |

Block size (BS) is the size of an image block 12 expressed in pixels 14. All image blocks 12 are square, therefore the block size is equivalent to the length in pixels 14 of either image block dimension. The input image horizontal dimension (IHD) is defined as the width in pixels 14 of the digital image 10 divided by the block size. The input image vertical dimension (IVD) is defined as the height in lines of the digital image 10 divided by the block size. The output buffer horizontal dimension (OHD) is defined as the width in bytes of a frame buffer (not shown) in the memory module 24.

Calculated values include the Start Address, Increment1, Increment2 and Increment3. The Start Address is defined as the destination address in the memory module 24 where the first sub-block is to be placed and is commonly offset from the actual hardware address of a frame buffer within the memory module 24. Increment 1, Increment 2 and Increment 3 are values used by the rotation assist module 28 to adjust the destination address for each sub-block 16.

The primary difference between the precalculated values supplied to the rotation assist module 28 for the case of a single rotated image 18 and for the N-up case is the value of Start Address. For the N-up case, an additional value called Start Address Offset is calculated and added to the value of Start Address in order to determine the destination address at where the first sub-block 16 of each rotated image 18 is placed. N-Up Row and N-Up column are parameters used to determine the Start Address Offset. N-Up Row and N-Up column represent which row and column, respectively, of the array of N rotated images 18 in which a particular image 18 will be placed. Additional information required for calculating the Start Address Offset includes the width (NWidth) of the array expressed in rotated images 18 and a unique image number (NImg) that identifies which of the N images is currently relevant. For example, if the memory module 24 is to store twelve images 18 arranged as three images 18 in the horizontal dimension and four images 18 in the vertical dimension, then the value of NWidth is three. NRow and NCol are intermediate values used in calculation of Start Address Offset. NRow and NCol are defined as the row and column of the array of N images 18 in which the current image will be placed.

The Start Address Offset is calculated as follows:

NRow=(the quotient of NImg divided by NWidth)+1

NCol=NImg−((NRow−1)*NWidth)

N-Up 0° and 180°:

Start Address Offset=((NRow−1)*OHD*IVD*BS)+(((NCol−1)*IHD*BS)/8)

N-Up 90° and 270°:

Start Address Offset=((NRow−1)*OHD*IHD*BS)+(((NCol−1)*IVD*BS)/8)

Figure 5:
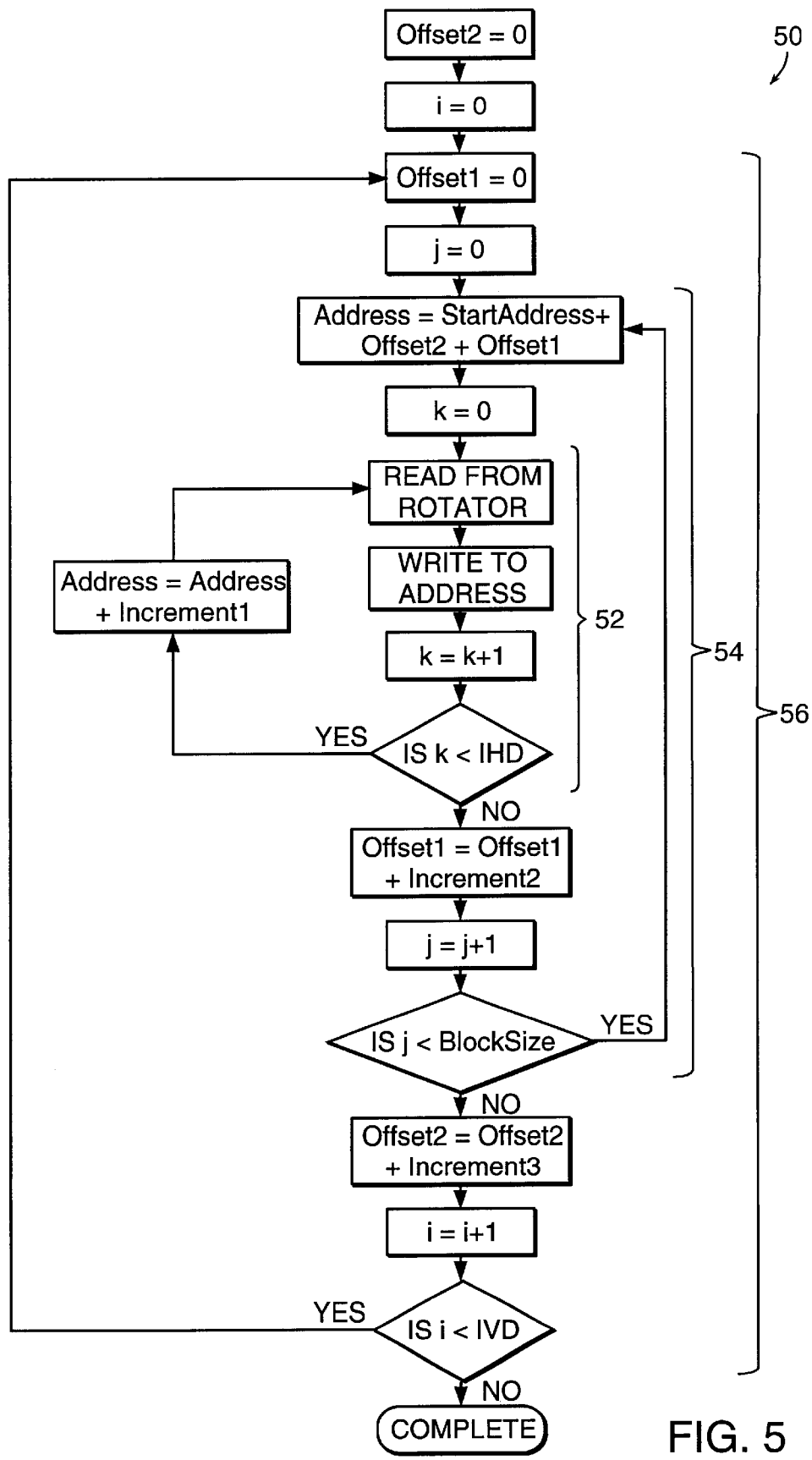
FIG. 5 is a flowchart of a method for determining the proper placement of rotated image blocks in an image buffer according to the invention.

The operations implemented in the rotation assist module 28 are the same regardless of the rotation angle or the number N of rotated images 18 to be stored in the memory module 24. Referring to FIG. 5, these operations are depicted in a flowchart 50 comprising a nested loop of steps to generate the destination address of each sub-block 16. Inner loop 52 is executed each time a sub-block 16 is written to the memory module 24. Middle loop 54 is executed for each rotated block 12' provided from the image processor 20. Outer loop 56 is executed once for each image 18 to be stored in the memory module 24.

Referring to FIGS. 6A to 6C as an illustrative example of the rotation assist feature implemented for a 90° clockwise rotation, a 32 pixel by 16 line image 10 is divided into square image blocks 12. Each image block 12 is defined by an array of 8×8 single bit pixels. Each image block 12 includes eight sub-blocks 16 and each sub-block 16 includes eight bits 14. The first sub-block 16 of the first image block 12 includes bits 0, 32, 64, . . . , 224 from the first column and the eighth (last) sub-block 16 of the first image block 12 includes bits 7, 39, 71, . . . , 231 from the last column. FIG. 6B illustrates the rotation of the individual image blocks 12 to generate a blockwise rotated image 10'. Each sub-block 16a,16b,16c in the original image 10 is arranged horizontally. In FIG. 6C, data moving operations performed by the rotation assist module 28 generate a fully rotated image 18 in the memory module.

Figure 7A:
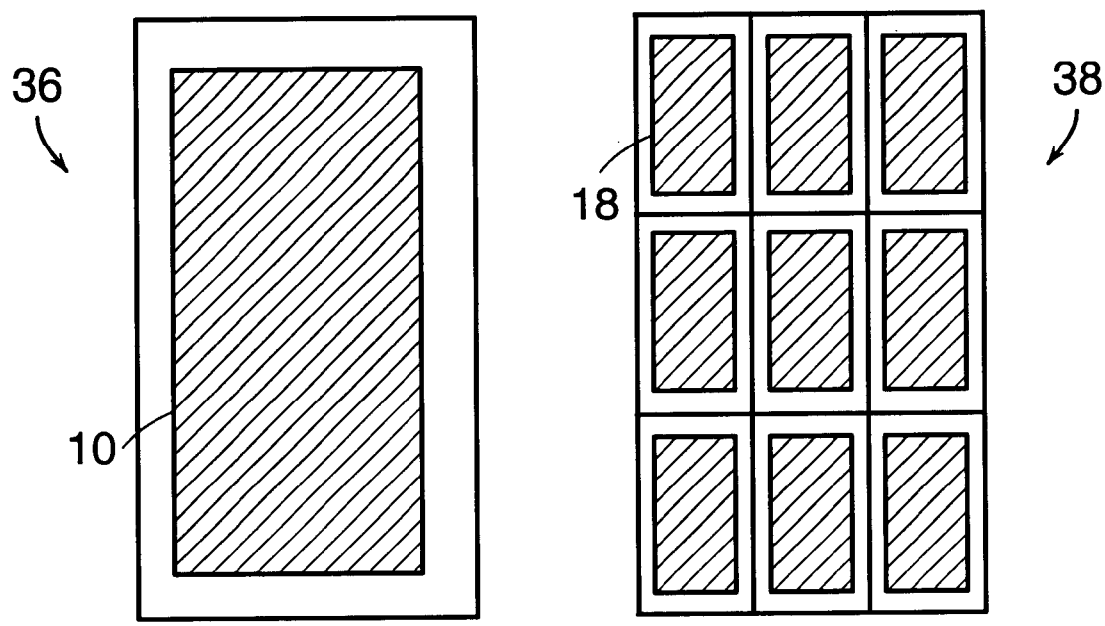

Referring to FIG. 7A for another illustrative example, an input document 36 having a digital image 10 is processed to generate an output document 38 having nine reduced size fully rotated images 18 arranged in three rows and three columns. In this example the rotation angle is 0°, the image blocks are 8×8 single bit pixel arrays, the sub-blocks are 8 pixels long (one byte) and the image 10 to be rotated is 24 pixels×16 lines. Referring to FIG. 7B, each box 62a,62b,62c represents one output byte. The first number in each box 62a,62b,62c is the offset from the start of the output frame buffer in the memory module 24. The second number in each box 62a,62b,62c is the order in which the sub-blocks 16 are provided from the image processor 20. The second number returns to one at the start of each new output image 18 from the image processor 20. The larger boxes 64a,64b,64c indicate the separation of the individual images 18 within the frame buffer.

In this example the start address for the eighth image would be calculated as follows:

Block Size=8

Input Image Horizontal Dimension=24/8=3

Input Image Vertical Dimension=16/8=2

Output Frame Horizontal Dimension=9 bytes

N-up width in images=3

N-up image number=8

N-up Row=(quotient of (NImg/NWidth))+1=(quotient of (8/3))+1= 2+1=3

N-up Column=NImg−((NRow−1)*NWidth)=8−((3−1)*3)=8−(2*3)= 8−6=2

Start Address Offset=((NRow−1)*OHD*IVD*BS)+(((NCol−1)*IHD*BS)/8)=((3−1)*9*2*8)+(((2−1)*3*8)/8)=291

Equivalents

While the invention has been particularly shown and described with reference to specific embodiments, it should be understood by those skilled in the art that various changes in form and detail may be made therein without departing from the spirit and scope of the invention as defined by the appended claims.

What is claimed is:

1. A method for assisting in the rotation of a digital image, comprising the steps of:

generating, prior to receiving a plurality of to be rotated image blocks at an image processor, a set of precalculated values in response to a request for rotation of the digital images, at least one of the precalculated values being derived from one of a predetermined rotation angle, an image block size, a horizontal digital image dimension, a vertical digital image dimension and an image memory module dimension each of the rotated image blocks comprising a plurality of sub-blocks;

performing only additive operations on at least two values in the set of precalculated values to determine a destination address for each sub-block; and storing each sub-block in an image memory module at the corresponding destination address.

2. The method of claim 1 wherein the step of generating the set of precalculated values is based on a predetermined rotation angle, the image block size, the horizontal and vertical digital image dimensions and the image memory module dimension.

3. The method of claim 2 wherein the step of generating the set of precalculated values is also based on the number of rotated digital images to be stored in the memory module.

4. The method of claim 1 wherein the digital image is rotated by an integer multiple of 90 degrees.

5. A method for rotating a digital image, comprising the steps of:

generating, prior to receiving a plurality of image blocks from an image processor, a set of precalculated values in response to a request for rotation of the digital image, each of the image blocks comprising a plurality of sub-blocks, the precalculated values being based on at least one of a predetermined rotation angle, an image block size, horizontal and vertical digital image dimensions and a memory module dimension;

rotating each of the plurality of image blocks through the predetermined rotation angle to generate a plurality of rotated image blocks;

performing only additive operations on at least two values in the set of precalculated values to determine a destination address for each of the sub-blocks; and storing each of the sub-blocks in a memory module at the destination address.

6. The method of claim 5 wherein the digital image is rotated by an integer multiple of 90 degrees.

7. An apparatus for assisting in the rotation of a digital image comprising:

a rotation assist module having a value input, a rotated block input and an output, the rotation assist module receiving a set of precalculated values at the value input and a plurality of rotated image blocks at the rotated block input, the set of precalculated values being received prior to receiving the rotated image blocks, at least one of the precalculated values being derived from one of a predetermined rotation angle, an image block size, a horizontal digital image dimension, a vertical digital image dimension and an image memory module dimension each of the rotated image blocks comprising a plurality of sub-blocks, the rotation assist module performing only additive operations on at least two values in the set of precalculated values to determine a destination address for each sub-block; and a memory module electrically coupled to the output of the rotation assist module for storage of each of the sub-blocks at each corresponding destination address.

8. The apparatus of 7 further comprising a processor electrically coupled to the value input of the rotation assist module, wherein the processor generates the set of precalculated values based on the predetermined rotation angle, the image block size, the horizontal and vertical digital image dimensions and a memory module dimension.

9. An apparatus for rotating a digital image comprising:

an input module for receiving a digital image to be rotated;

an image processor electrically coupled to the input module for generating a plurality of image blocks to be rotated from the digital image and rotating the image blocks through a predetermined rotation angle, each of the image blocks comprising a plurality of sub-blocks;

a value processor for generating a set of precalculated values in response to a request for rotation of the digital image based on at least one of the predetermined rotation angle, an image block size, horizontal and vertical digital image dimensions and a memory module dimension;

a rotation assist module electrically coupled to the image processor and the value processor and having an output, the rotation assist module receiving the set of precalculated values from the value processor prior to receiving the rotated image blocks from the image processor, the rotation assist module performing only additive operations on at least two values in the set of precalculated values to determine a destination address for each sub-block; and a memory module electrically coupled to the output of the rotation assist module for storage of each of the sub-blocks at each corresponding destination address.

10. The apparatus of claim 9 further comprising a microprocessor wherein the microprocessor comprises the value processor and the image processor.

11. The apparatus of claim 10 wherein the microprocessor further comprises the rotation assist module.

\* \* \* \* \*